US006747677B2

(12) United States Patent
Millmore

(10) Patent No.: US 6,747,677 B2
(45) Date of Patent: Jun. 8, 2004

(54) DISPLAY SYSTEM AND METHOD FOR DISPLAYING CHANGE TIME INFORMATION RELATING TO DATA STORED ON A DATABASE

(75) Inventor: Martin John Millmore, Reading (GB)

(73) Assignee: Oracle International Corporation, Redwood Shores, CA (US)

(*) Notice: Subject to any disclaimer, the term of this patent is extended or adjusted under 35 U.S.C. 154(b) by 451 days.

(21) Appl. No.: 09/866,799

(22) Filed: May 30, 2001

(65) Prior Publication Data

US 2002/0180794 A1 Dec. 5, 2002

(51) Int. Cl.[7] .................................................. G06F 3/00
(52) U.S. Cl. .................... 345/772; 345/810; 345/968
(58) Field of Search ................................. 345/764, 772, 345/810, 440, 771, 966, 968

(56) References Cited

U.S. PATENT DOCUMENTS 5,220,657 A  *  6/1993  Bly et al. ................... 711/152
5,321,838 A  *  6/1994  Hensley et al. ............. 717/125
5,838,323 A  * 11/1998  Rose et al. .................. 715/526
5,872,909 A  *  2/1999  Wilner et al. ................ 714/38
5,973,687 A  * 10/1999  Foley et al. ................. 345/866
6,100,887 A  *  8/2000  Bormann et al. ........... 345/764
6,219,050 B1 *  4/2001  Schaffer ..................... 345/853
6,289,355 B1 *  9/2001  Haderle et al. ............. 707/200
6,384,848 B1 *  5/2002  Kojima et al. .............. 345/808
6,486,896 B1 * 11/2002  Ubillos ....................... 345/784
6,507,845 B1 *  1/2003  Cohen et al. ............... 707/100
6,600,501 B1 *  7/2003  Israel et al. ................. 345/810

* cited by examiner

Primary Examiner—John Cabeca
Assistant Examiner—Kieu D. Vu
(74) Attorney, Agent, or Firm—Swidler Berlin Shereff Friedman, LLP

(57) ABSTRACT

A display system and method for displaying information relating to data stored on a database. The system comprises a processor for obtaining information relating to data stored on a database, the information defining times at which the data changed. The processor generates display control signals to cause the display to generate an elongate display element extending along a time axis and which exhibits indicia defining the times of occurrence of changes in the data.

16 Claims, 4 Drawing Sheets

FIG. 4

DISPLAY SYSTEM AND METHOD FOR DISPLAYING CHANGE TIME INFORMATION RELATING TO DATA STORED ON A DATABASE

FIELD OF THE INVENTION

The invention relates to a display system and method for displaying information relating to data stored on a database.

DESCRIPTION OF THE PRIOR ART

A typical database stores data defining a variety of field types which changes over time. In the case of personnel records, a set of data fields are maintained for each person including details such as his name, address, grade and the like. From time to time some of this information will change, particularly items such as the person's grade or address. Currently on the Oracle Human Resources system, this information is stored as one row in the database for each period of information, (for example one row for Jan. 1, 1990 to Feb. 3, 1991 in which the Grade is Grade 1, and one row for Feb. 4, 1991 to Jul. 9, 1991 in which the Grade is Grade 2). More than one piece of information can change at any one time (e.g. a person's Job Title may change at the same time as their Grade changes), and the changes may apply for different periods of time (e.g. the person's Grade may change again at a later date without their Job changing again).

When the information is displayed to a user, the information shown is the information that is current as of a particular date, the Effective Date. This Effective Date need not be the current date, but may be changed by the user to display the information that is applicable for any point in time.

One problem with this system is that the user can only see the data for one time period at any one time. They can see the range of dates for which this data is applicable, but not what has changed before and after these dates, and how many other changes have occurred. This was overcome by allowing the user to open up a new window (the Date Track History window) which showed a table with a list of the dates, and the data items which changed on each date. However to see, or alter the data on a particular date, the user had to open a window (the Effective Date window) which allowed them to enter a new Effective Date, and then close the window, refreshing the data in the form.

SUMMARY OF THE INVENTION

In accordance with a first aspect of the present invention, a display system for displaying information relating to data stored on a database comprises a processor for obtaining information relating to data stored on a database, the information defining times at which the data changed, and for generating display control signals to cause a display to generate an elongate display element extending along a time axis and which exhibits indicia defining the times of occurrence of changes in the data.

In accordance with a second aspect of the present invention, a method of displaying information relating to data stored in a database comprises obtaining information relating to data stored on the database, the information defining times at which the data changed, and displaying on a display an elongate display element extending along a time axis and which exhibits indicia defining the times of occurrence of changes in the data.

With this invention, a much more user friendly display has been achieved to enable a user to view changes in data stored on a database with changes in data being shown in an easily understandable graphical format without the need to open new windows.

In some cases, however, the elongate display element will only represent a portion of the total time period represented by the data in the database. In order to view other portions of the data, the system is preferably adapted to respond to user input commands to generate a new date with respect to which the elongate display element is redisplayed. Typically, this will be the date on which the elongate display element is centred. In some cases, this could involve entering the date via a keyboard or the like but in a particularly preferred aspect of the invention, the user can utilize the elongate display element itself to define the new date. This is most conveniently achieved using a pointer icon, typically controlled by a mouse.

The indicia defining the times of occurrence of changes in the data could be simple lines but in the preferred approach, the elongate display element is formed of a sequence of sections, each section corresponding to a period during which the data remains unchanged. Typically, adjacent sections will have different colours so that they can be easily distinguished.

In general, the elongate display element will define changes in data of a common field type such as an address or grade in the example mentioned above. However, changes in the data record as a whole or within a group of data items could also be represented. Where changes in multiple data items are shown, these could be represented by a single elongate display element with indicia indicating the change in any of the members of the group or alternatively a set of elongate display elements could be provided one above the other, each corresponding to a single data item.

Typically, date information will be displayed alongside the elongate display element and in some cases the value of the data could be indicated within the elongate display element although often this will be difficult in the limited space usually available.

BRIEF DESCRIPTION OF THE DRAWINGS

An example of a system and method according to the present invention will now be described with reference to the accompanying drawings, in which.

DETAILED DESCRIPTION OF THE EMBODIMENT

Figure 1:
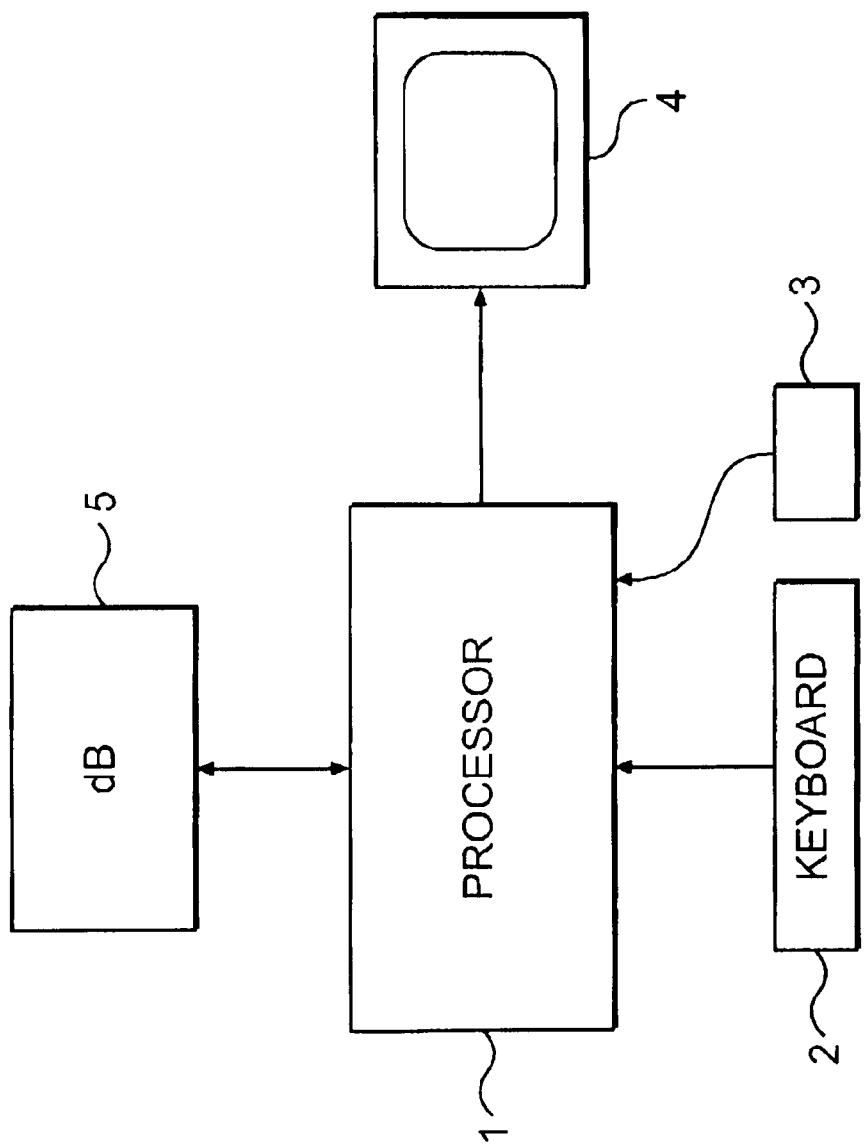
FIG. 1 is a block diagram of the system.

The system shown in FIG. 1 comprises a microprocessor 1 controlled by a keyboard 2 and mouse 3 and connected to a monitor display 4. The processor is connected to a database 5 which may be local to the processor or located elsewhere in the world, the processor being connected to the database 5 via a suitable link such as a telephone line or the like. The database 5 could be located on a single server or distributed across several servers.

In the present example, the handling of data defining personal records will be described. Thus, for each member of a firm, a data record will be maintained in which personal details relating to that person are stored. Examples of data items are the person's name and address, nationality, grade, age and the like. The database 5 holds this information and also holds a date track history which records for each data item the dates for which the data item had a particular value.

Figure 2:
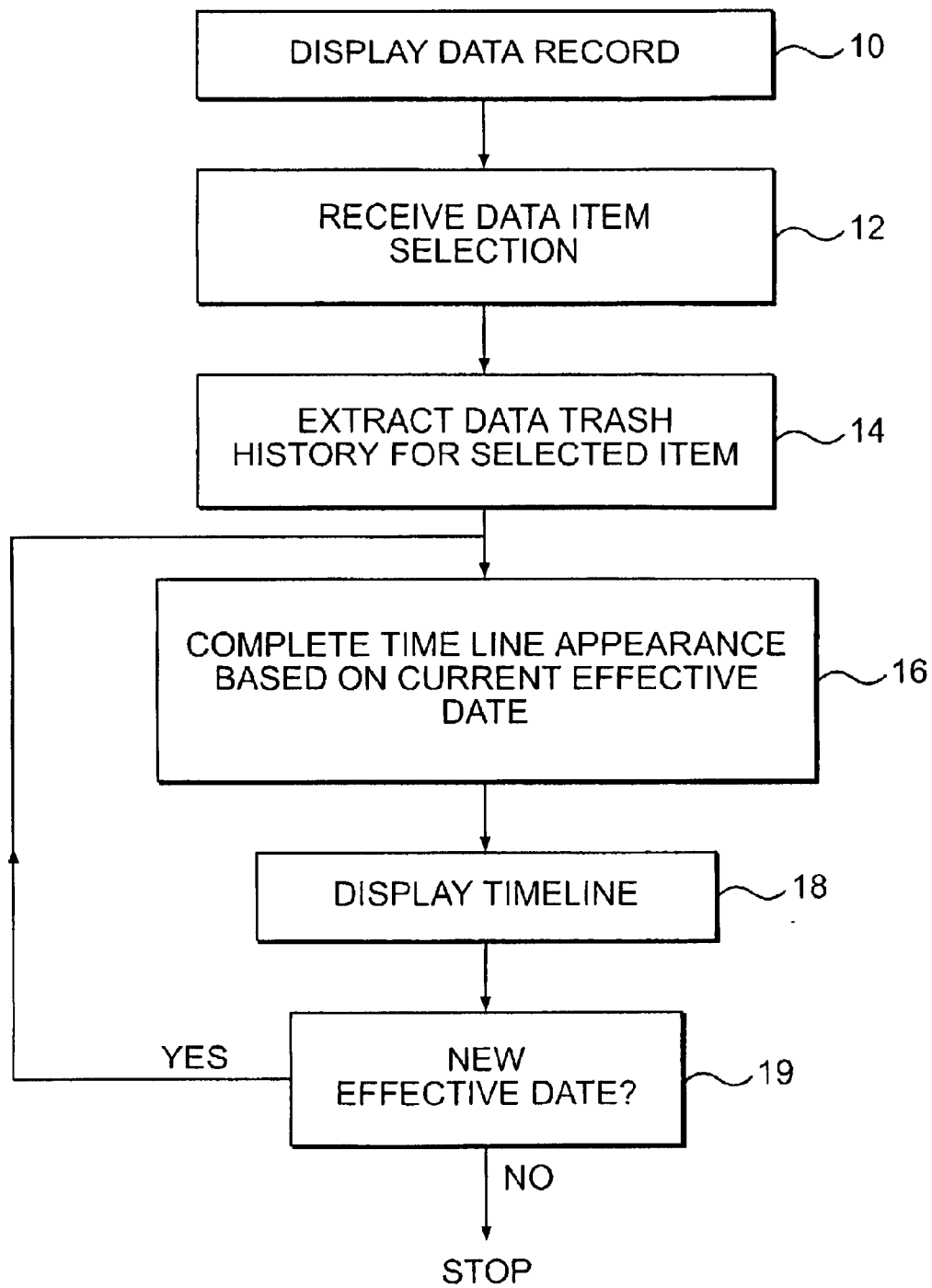
FIG. 2 is a flow diagram illustrating operation of the system shown in FIG. 1; and, FIGS. 3 and 4 illustrate two different screen displays.

When a user wishes to view a data record, he sends a suitable instruction to the processor 1 via the keyboard 2 identifying the data record concerned. The processor 1 then extracts the data record from a database 5 and displays it in a predetermined format on the monitor 4 (step 10, FIG. 2).

Figure 3:
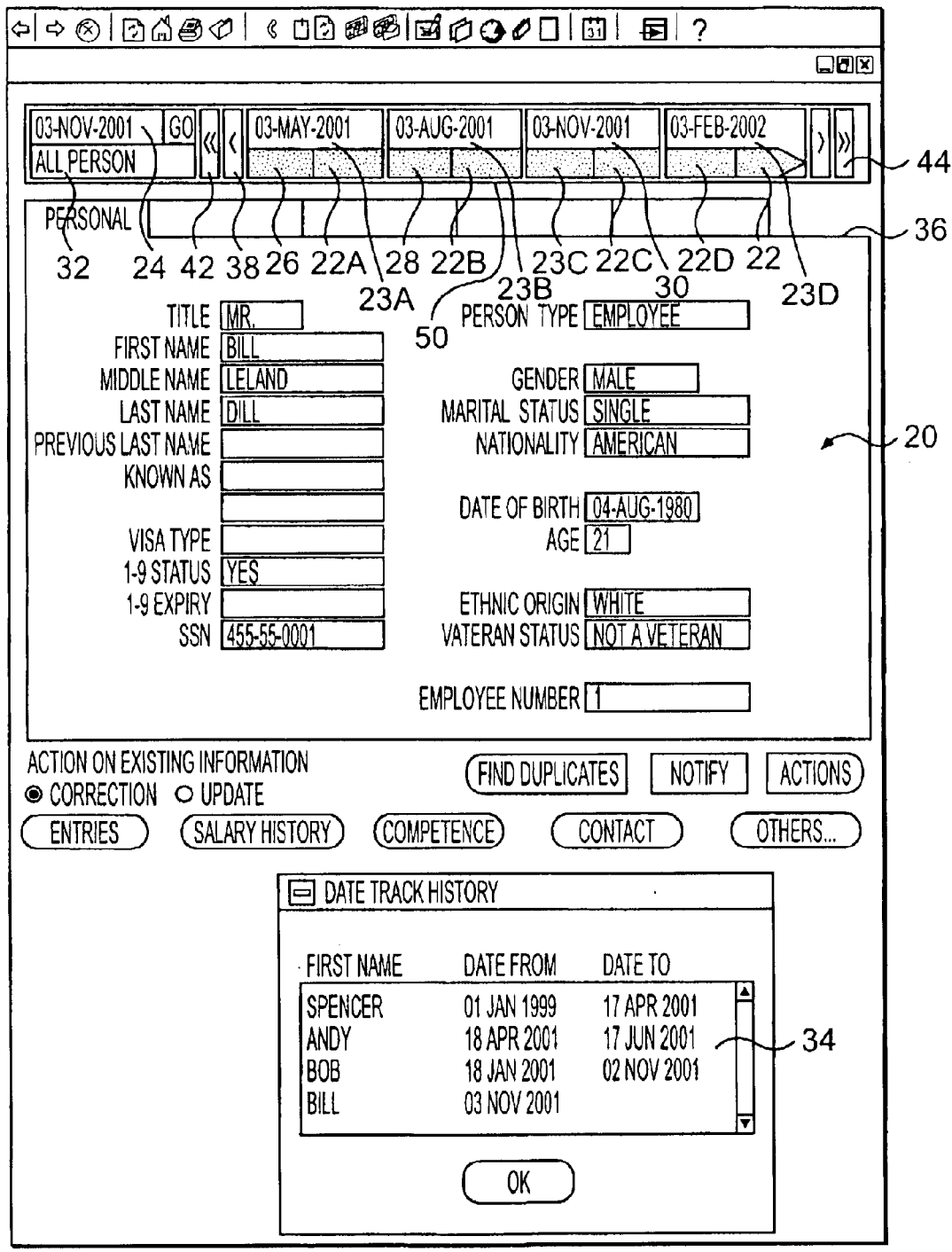

FIG. 3 illustrates an example of this display. As can be seen in FIG. 3, the display includes a central region 20 in which the current values of each data item are displayed and various tabs and other icons are included to enable other parts of the data record to be displayed. Since these are not relevant to the present invention, they will not be described further but are to be found in the Oracle Human Resources system.

In addition to the main display 20, an elongate display element or time line 22 is displayed above the main display area 20. The time line is divided into three month sections 22A–22D with the centre of the time line corresponding to the effective date Nov. 3, 2001. This effective date is also shown at 24 and initially will be today's date.

The time line 22 is made up of a number of differently coloured sections indicated at 26,28,30 respectively. These sections indicate periods during which there have been no changes in values of data items. Initially, a tab 32 is selected as "All Person" which means that the processor 1 reviews all data items within the data record to look for changes.

Thus, in a step 12, the processor 1 initially receives a default data item selection "All Person" and extracts the date track history record for the selected data item (step 14).

FIG. 3 illustrates the date track history for this data record at 34 although this will not normally be shown unless requested by the user. This shows that the only changes in this data record are in the first name of the person concerned. Thus, from Jan. 1, 1999 to Apr. 17, 2001 the name of the person was "Spenser", it then changed to "Andy" until Jun. 17, 2001, and then to "Bob" until Nov. 2, 2001 and finally to "Bill". In some applications, a separate date track history can be maintained for each data record.

Having reviewed the date track history, the processor 1 then computes the appearance of the time line 22 based on the current effective date which is initially set to todays date: Nov. 3, 2001 (step 16). As mentioned above, this is the date on which the time line 22 is centred. Having computed the time line appearance in step 16, the processor 1 then causes the time line 22 to be displayed (step 18) and then monitors for the input of a new effective date (step 19). If a new effective date is entered, processing returns to step 16 and the time line appearance is recomputed so as to be centred on the new effective date. The new effective date will also be displayed in the box 24.

The left most part of the time line 22 has a section 26 which terminates approximately mid-way through the three month period 22A corresponding, in fact, to Jun. 17, 2001 which is the date at which the first name changed from Andy to Bob. The next section 28 extends to Nov. 2, 2001 at which point the name changed from Bob to Bill. Section 30 then commences.

The processor 1 indicates that there are no further changes by forming the right hand end of the time line into an arrow shape as indicated at 36. The left hand end of the time line 22, however, is squared off which indicates the presence of one or more other changes at earlier times and in this case corresponds to the fact that there was a name change on Apr. 17, 2001.

In this example, the commencement date of each section 22A,22B etc. is indicated at 23A,23D respectively although this is an option.

A new effective date can be entered in a number of different ways. Firstly, a new date can be simply typed into the box 24.

In a second method one of four navigation buttons 36,38, 42,44 can be clicked. One 42 changes the Effective Date to the start of the record. One 38 changes the Effective Date to the first day of the previous change in the currently displayed item. One 40 changes the Effective Date to the first day of the next change in the currently displayed item. The last button 44 changes the Effective Date to the first day of the last change in the currently displayed item. When the Effective Date is changed, the data displayed in the form will be refreshed, and the time line 22 will be redisplayed with the new effective date at the centre, and the Effective Date Box 24 will be updated.

Finally, and most importantly, it is possible to use the mouse to move a pointer indicated schematically at 50 to a point along the existing time line display and if it is then clicked, the processor 1 will compute the date in alignment with the pointer and use this as the new effective date on which the next time line is to be centred.

In all these cases the effective data box 24 will be changed accordingly.

Figure 4:
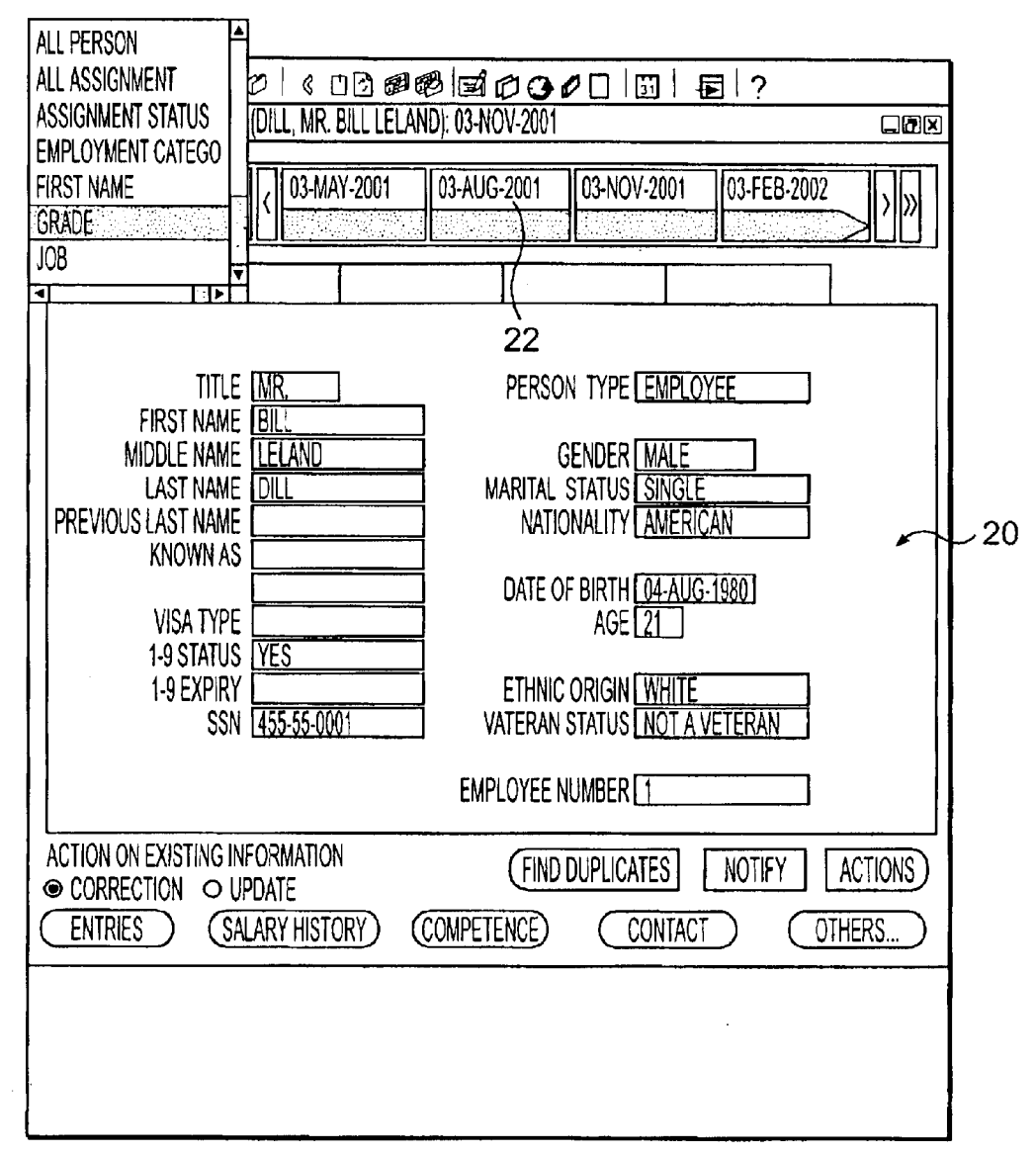

In FIG. 3, the time line was selected in accordance with the "All Person" tab selected at 32. However, the user can limit to the display of a single data item as indicated in FIG. 4. In this case, the user has displayed a number of the possible data items which can be used to define the time line and has selected the data item "Grade". The time line has thus been recomputed based on Grade and since Grade has not changed for the period displayed, the time line 22 has the same appearance throughout its length.

Although the total length of the time line 22 shown in FIGS. 3 and 4 corresponds to one year, it will be possible to vary this total length as required by the user. Also, as mentioned above, the sections 26,28 etc. could also include an explanation of the data value eg. first name, which that section represents.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROMs, as well as transmission-type media, such as digital and analog communications links.

I claim:

1. A display system for displaying information relating to data stored on a database, the system comprising a processor for obtaining information relating to data stored on a database, the information defining times at which the data changed, and for generating display control signals to cause a display to generate an elongate display element extending along a time axis and which exhibits indicia defining the times of occurrence of changes in the data; wherein the processor causes the elongate display element to define a portion of a total time period represented by the data in the database and wherein the processor causes the elongate display element to include an indication, where appropriate, that no further changes in the data occur at times which are not displayed.

2. A system according to claim 1, wherein the processor causes adjacent sections of the elongate display element on either side of a data change to have different colours.

3. A system according to claim 1, wherein the processor is adapted to redisplay the elongate display element, in response to a user command, based on a date defined by the user command.

4. A system claim 3, wherein the processor causes the elongate display element to be redisplayed centered on the date defined by the user command.

5. A system according to claim 3, wherein the processor is adapted to determine the date with respect to which the elongate display element is to be displayed from a position along the currently displayed elongate display element indicated by the user.

6. A system according to claim 5, wherein the said position along the currently displayed elongate display element indicated by the user is generated by means of a pointer icon.

7. A system according to claim 6, the system further including a mouse for controlling the position of the pointer icon.

8. A system according to claim 1, wherein the processor is adapted to display date information alongside the elongate display element.

9. A display system according to claim 1, further comprising a display on which the elongate display element is displayed.

10. A method of displaying information relating to data stored on a database, the method comprising obtaining information relating to data stored on the database, the information defining times at which the data changed, and displaying on a display an elongate display element extending along a time axis and which exhibits indicia defining the times of occurrence of changes in the data; wherein the elongate display element defines a portion of a total time period represented by the data in the database and further comprising causing the elongate display element to include an indication, where appropriate, that no further changes in the data occur at times which are not displayed.

11. A method according to claim 10, wherein the data relates to a common field type.

12. A method according to claim 10, wherein adjacent sections of the elongate display element on either side of a data change have different colours.

13. A method according to claim 10, further comprising causing the elongate display element to be redisplayed, in response to a user command, based on a date defined by the user command.

14. A method according to claim 13, wherein the elongate display element is redisplayed centered on the date defined by the user command.

15. A method according to claim 13, further comprising indicating a position along the currently displayed elongate display element to define the date with respect to which the elongate display element is to be redisplayed.

16. A method according to claim 10, further comprising displaying date information alongside the elongate display element.

* * * * *